US00RE33857E

United States Patent [19]

Ariessohn et al.

[11] E Patent Number: Re. 33,857

[45] Reissued Date of Patent: Mar. 24, 1992

[54] IMAGING OF HOT INFRARED EMITTING SURFACES OBSCURED BY PARTICULATE FUME AND HOT GASES

[75] Inventors: Peter C. Ariessohn, Sumner; Richard K. James, Federal Way, both of Wash.

[73] Assignee: Weyerhaeuser Company, Tacoma, Wash.

[21] Appl. No.: 62,481

[22] Filed: Jun. 15, 1987 (Under 37 CFR 1.47)

Related U.S. Patent Documents

Reissue of:

[64] Patent No.: 4,539,588
Issued: Sep. 3, 1985
Appl. No.: 468,425
Filed: Feb. 22, 1983

[51] Int. Cl.[5] ..... H04N 7/18

[52] U.S. Cl. ..... 358/113; 250/330; 250/339; 250/342; 250/357.1; 358/100; 358/101; 358/108; 374/124; 374/127

[58] Field of Search ..... 358/100, 101, 107, 108, 358/93, 113; 250/338, 340, 342, 357.1; 374/121, 123, 124, 127

[56] References Cited

U.S. PATENT DOCUMENTS

| | | | |
|---|---|---|---|
| 3,477,291 | 11/1969 | Osawa | 374/127 |
| 3,477,823 | 11/1969 | Freiday | 358/100 |
| 3,544,710 | 12/1970 | Poos | 358/100 |
| 3,588,067 | 6/1971 | Shimotsuma | 358/100 |
| 3,718,758 | 2/1973 | Ponghis | 358/100 |
| 4,110,617 | 8/1978 | Legille | 250/342 |
| 4,131,914 | 12/1978 | Bricmont | 358/100 |
| 4,218,989 | 8/1980 | Fujita et al. | 118/713 |
| 4,222,506 | 9/1980 | Sakashita et al. | 222/600 |
| 4,264,203 | 4/1981 | Pirlet | 356/241 |
| 4,288,162 | 9/1981 | Sakamoto et al. | 356/335 |
| 4,315,771 | 2/1982 | Bobillon | 358/100 |
| 4,353,257 | 10/1982 | Vrba et al. | 73/623 |
| 4,463,437 | 7/1984 | Schenck | 358/100 |

FOREIGN PATENT DOCUMENTS

| | | |
|---|---|---|
| 879645 | 10/1979 | Belgium . |
| 2330032A1 | 1/1975 | Fed. Rep. of Germany . |
| 53-9256 | 4/1978 | Japan . |
| 343952 | 7/1972 | U.S.S.R. . |
| 1461242 | 1/1977 | United Kingdom . |

OTHER PUBLICATIONS

*SPIE*, vol. 62 (1975), Infrared Technology, "Handheld Thermal Viewer", pp. 249–53; S. Staniloff et al.

*AGA*, Thermovision 782, ©1982–8 pages.

Bauer and Dorland, "Thermodynamics of the Combustion of Sodium-base Pulping Liquors", Canadian J. of Technology, vol. 32, p. 91 (1953).

Edwards, "Absorbtion by Infrared Bands of Carbon Dioxide Gas at Elevated Pressures and Temperatures", J. Optical Society, vol. 50, No. 6, p. 617 (1960).

Huovilainen & Ruuskanen, "New Methods for Flame Detection and Temperature and Dust Measurements in (List continued on next page.)

*Primary Examiner*—Howard W. Britton
*Attorney, Agent, or Firm*—John O. Graybeal

[57] ABSTRACT

An apparatus is described which is capable of producing an image of a smelt bed of inorganic chemicals collected at the bottom of a kraft pulp recovery boiler. The image produced is free of interferences of fume particles and gaseous radiation which have obscured prior attempts to view hot surfaces under such environmental conditions. The apparatus includes an industrial closed circuit video camera fitted with an infrared imaging detector or vidicon tube. An objective lens obtains the image. An optical filter interposed between the lens and the vidicon is a key element of the invention and is selected to reject radiation less than about a micrometer to avoid fume interference. The filter is further selected to reject all but limited ranges of radiation to avoid gaseous species overlying the smelt bed which are strongly emitting and absorbing. As an example, a spectral filter centered at 1.68 micrometers with a band width of 0.07 micrometer is suitable for imaging a kraft recovery smelt bed.

22 Claims, 2 Drawing Sheets

OTHER PUBLICATIONS

R.B. Furnaces", Int'l Conf. on Recovery of Pulping Chemicals, p. 115 (1981).

Tourin, "Measurements of Infrared Spectral Emissivities of Hot Carbon Dioxide in the 4.3 micron Region", J. Optical Soc. of America, vol. 51, No. 7, p. 175 (1961).

Tourin, "Infrared Techniques for Temperature Measurement in Plasmajets", J. Heat Transfer, A.S.M.E. Trans., p. 164 (1962).

Ferriso and Ludwig, "Spectral Emmissivities and Integrated Intensities of the 2.7 micron $H^2O$ Band between 530° and 2,200° K.", J. Quant. Sectrosc. Radiat. Trans., vol. 4, p. 215 (1964).

Abu-Romia and Tien, "Measurements and Correlations of Infrared Radiation of Carbon Monoxide at Elevated Temperatures", J. Quant. Spectrosc. Radiation, vol. 6, p. 143 (1965).

Stelling and Vegteby, "Corrosion on Tubes in Black Liquor Recovery Boilers", Canadian Paper & Pulp Assoc., Tech. Paper No, T236, p. 51 (1969).

Johannson, "The practice of thermography in engineering and medicine", Australian Electronics Engr., p. 40 (1970).

Ludwig, "Measurements of the Curves-of-Growth of Hot Water Vapor", Applied Optics, vol. 10, No. 5, p. 1057 (1971).

Bosch, Pilat & Hrutfiord, "Size Distribution of Aerosols from a Kraft Mill Recovery Furnace", TAPPI, vol. 54, No. 11, p. 1871 (1971).

Jeitz, Muller & Pirlet, "Endoscopy in High-Temperature Environment. Application of the C.R.M. Probe for Refractory Convertor Linings", C.R.M. Paper No. 21, p. 13 (1972).

NASA, "Handbook of Infrared Radiation from Combustion Gases", NASA Handbook No., SP-3080, ch. 6, p. 241 (1973).

Borg, Teder & Warnqvist, "Inside a kraft recovery furnace—studies on the origins of sulfur and sodium emission", TAPPI, vol. 57, No. 1, p. 126 (1973).

Hellstrom, "Recentes Avancos en Technologia de Caldeiras de Recuperacao Kraft", O Papel, p. 51 (1974).

Turner, "State of the Art and Trends in Pulp Mill Boiler Emission Controls", Paper Trade J., Nov. 25, 1974, p. 30 (1974).

Raytek, "Raytek Thermalert S/L—Industrial Infrared thermometer system", (1975 approx.).

AGA, AGA Thermovision 750", (1975).

AGA, "AGA Thermovision 750 Accessories", AGA Publication No. 556,409 (1975).

Smolyak et al., "Investigating the formation of the stockline contour and the stock-column structure in the blast furnace", Dneprodzerzhinsk et al. and Base Experimental Design Laboratory, Ukranian SSR Ministry of Ferrous Metallurgy, (1975 aprox.).

Staniloff et al. (Philips), "Handheld Thermal Viewer, AN/PAS-7", Infrared Technology, SPIE, vol. 62, p. 249 (1975).

Smolyak et al., "Monitoring the Blast Furnace Stockline Level and Profile", Metallurg, No. 2, pp. 11-12 (1975).

Hellstrom, "Recent Advances in Kraft Recovery Boiler Technology are Explored", Paper Trade J., Jul. 1, 1975, p. 26 (1975).

Zissis, "Fundamentals of Infrared—A review", SPIE vol. 62, Infrared Technology, p. 67 (1975).

Williamson, "Williamson System 4400", Williamson Data Sheet No. 57 (1975).

VanLangen and Flierman, "Information, instrumentation, and quality monitoring in ironmaking", Publication No. 24579/2, p. 78 (1975).

Ziegert, "Blast Furnace Control at Inland Steel's Nos. 5 and 6 Blast Furnaces", A.I.M.E. Proceedings, vol. 36, p. 298 (1977).

AGA, "The AGA System IRBIS", AGA publication No., 556 556 390 (1977).

Johannson, "A New Real-time Infrared Imaging on Measuring System for Burden Top Temperature Monitoring on Blast Furnaces", ISA Transactions, vol. 17, No. 4, p. 47 (1977).

Congram, "System of infrared imaging can help spot difficulties in processing", Oil and Gas J., Feb. 7, 1977, p. 60 (1977).

Chao, Dugdale, Morris, Steward, "Gas Composition, Temperature and Pressure Measurements in a Lead Blast Furnace", Metallurgical Trans. B, vol. 9B, p. 293 (1978).

Turner, "A Video Monitoring System for Enriched Uranium Casting Furnaces", Union Carbide Paper, No. Y-2112 (1978).

Nik & Cartright, "Computerized Control of New Blast Furnace at Inland Steel", Industrial Heating, Sep. 1979, p. 15 (1979).

(List continued on next page.)

OTHER PUBLICATIONS

Tonteling (ARBED), "Computer Analysing of Infrared Blast Furnace Burden Data", Proc. Ironmaking Conf., vol. 38, p. 327 (1979).

Burgess, "Developments in Blast Furnace Gas Distribution Research", Seventh Australian Conf. on Chemical Engineering, (1979).

Lillquist, "An Infrared Pyrometer for Measuring 700-900 Kelvin Surface Temperatures in a Combustion Gas Background Environment", A.S.M.E. Publ. No., 80-HT-5 (1980).

Morris & Knoepke, "Discussion of Gas Composition, Temperature and Pressure Measurements in a Lead Blast Furnace", Metallurg. Trans. B, vol. 11B, p. 336 (1980).

Mikron, "MIKRON 51 Infrared Thermometer", Mikron Publication No. M51-80 (1980).

Tai, Aleksoff and Chang, "Imaging through scattering media by interferometric techniques", Applied Optics, vol. 20, No. 14, p. 2484 (1981).

Kopeika, "General wavelength dependence of imaging through the atmosphere", Applied Optics, vol. 20, No. 9 (1981).

Ireon, Inc., "MODLINE Pyrometres Infrarouges", Catalogue, MO-110 (1981).

Beynon, "The Use of Infrared Thermometers to Measure Load Temperature in Reheat Furnaces: The Simplest Two-Thermometer Approach", Land Pyrometers Limited, (1981).

Mikron, "MIKRON 80 series—Digital Infrared Thermometers", MIKRON Catalog M80 Rev. C. P.N. 11760-80 (1981).

AGA, "AGA Thermovision 782", AGA Publication No., 556 556 626 (1982).

Icon, Inc., "MODLINE Infrared Thermometers", Catalog, MO-112 (1983).

Lankford et al. (U.S. Steel), "The Making, Shaping and Treating of Steel", A.I.S.E., p. 441 (1985).

Glessner, S., "Chemical Recovery Cuts Materials Costs While Removing 99% of Particulates", Chem. Processing, vol. 38, No. 7, p. 62 (1975).

Thoen and DeHaas, "Kraft Recovery Furnace Smelt Bed Measurement System", Tappi, vol. 60, No. 2 (1977).

Ariessohn, "An Experimental Measurement of the Spectra of MHD Plasmas", High Temp. Gas Dynamics Lab., Memo. Report 10 (1978).

Richardson & Merriam, "Study of Black Liquor Recovery Furnace Firing Conditions", Char Bed Characteristics and Performance, Phase 2 Report", Arthur D. Little, Call No. TS 1080 A5 (1978).

Richardson & Merriam, "Study of Black Liquor Recovery Furnace Firing Conditions, Char Bed Characteristics and Performance", Tappi Eng. Conf. Proc., vol. III, p. 559 (1979).

Fadum, O.-K., "Integrated Process Control Systems Enhance Mill (R.O.I.) Return On Investment Capabilities.", Paper Trade J., vol. 164, No. 1, p. 26 (PaperChem 51-03414) (1980).

Ariessohn, "Optical Diagnostic Measurements of Coal Slag Parameters in Combustion MHD Systems", High Temp. Gas Dynamics Report No. 119 (1980).

Merriam, "KRAFT version 2.0—Computer Model of a Kraft Recovery Furnace—vol. II: Engr. Manual", Arthur D. Little (1980).

Deininger & Kupperman, "Infrared Techniques for the Evaluation of Silicon Carbide Heat-Exchanger Tubing", Journal of Testing and Evaluation, vol. 8, No. 1, p. 38 (1980).

F. L. Smidth, "Kiln Refractory Control . . . Computerised".

Hughes Aircraft Co. & Standard Equipment Co., "PROBEYE Infrared Viewers" (1980).

Standard Equipment Co., "VideoTherm Thermal Imaging System—Model SEC-84" (1980).

Arvin/Diamond, "Brochures re Retractable Cameras, Air Filters, & High Temperature Cameras".

Wahl Instruments, Inc., "Wahl HEAT SPY Photo-Scan Infrared Thermometer" (1980).

Hamamatsu TV Co., Ltd., "Technical Data Sheet No. N-032-01-N214 Series Infrared Vidicons" (undated).

Hamamatsu TV Co., Ltd., "Infrared Vidicons—Characteristics and Applications—Application No. Res. 0794" (undated).

IMAGING OF HOT INFRARED EMITTING SURFACES OBSCURED BY PARTICULATE FUME AND HOT GASES

Matter enclosed in heavy brackets [ ] appears in the original patent but forms no part of this reissue specification; matter printed in italics indicates the additions made by reissue.

BACKGROUND OF THE INVENTION

The present invention relates to apparatus for producing a continuous visual image of the physical conditions in the interior of a hot vessel. The technology of interest images hot interior surfaces where the surfaces are obscured by fume and radiation emitting/absorbing gases associated with a process taking place in the vessel. More particularly, the invention relates to imaging the interior of a wood pulp chemical recovery boiler.

In a manufacture of wood pulp, raw wood is digested in the presence of inorganic chemicals. In the sulfate or kraft pulping processes the active pulping chemicals are sodium hydroxide and sodium sulfide. An important aspect of kraft pulping is recovery of these inorganic pulping chemicals from the liquid pulping waste stream. This waste liquid, commonly called black liquor, is an aqueous mixture of lignin extracted from the wood and reacted inorganic pulping chemicals, principally sodium carbonate and sulfate. Economics of the overall pulping process require recovery of the relatively expensive pulping chemicals from the waste black liquor.

Conventionally, black liquor is combusted in a boiler designed to recover the pulping chemicals and extract thermal energy from the organic matter in the black liquor for steam production. The chemical recovery boiler receives black liquor after it has been concentrated in evaporators. The liquor is burned in the furnace and the chemicals are recovered as a molten smelt in the bottom of the boiler from which it discharges for recycling back into a fresh pulping liquor makeup system.

A principal function of the recovery process is the reconversion of sodium sulfate back to active sodium sulfide by the carbon residues in the boiler. Temperature and air flows are controlled to maintain a reducing zone in the boiler to change as much of the sodium sulfate as possible into sodium sulfide. The degree of reduction of sulfate to sulfide in the melt reflects the efficiency of the chemical recovery function and determines the quality of the chemical product from the recovery boiler.

The characteristics of the bed of molten solids and how they affect heat and chemical recovery are not known with certainty. This is largely due to the lack up until now of a means for accurately observing or measuring bed configuration. Fume and gaseous emissions from the smelt bed typically prevent significant continuous visual observation.

The bed itself is generally a very porous lattice containing approximately 5% carbon by weight. The typical smelt bed temperature is about 1000° C. with overlying combustion gases at temperatures of 1100°-1300° C.

What is known suggests that smelt bed height on the floor of the furnace affects the efficiency of achieving the primary goal of reducing sodium sulfate to sulfide. In general, a medium bed height suggests good chemical reducing environment. On the other hand, a low bed height is thought to be safest, depending upon boiler geometry, providing short cool down times following emergency shutdowns. Also, an unstable bed size is related, in general, to less stable boiler operations, leading potentially to dangerous blackouts.

The present knowledge of the effect of bed inventory and distribution on the operations of the recovery system as a whole is enough to suggest that a constant bed inventory is essential to maintaining stable boiler operations. To achieve this goal, a clear continuous visual image of the bed would provide much of the information needed to permit improvement of control of the bed and, hence, improved chemical recovery.

THE PRIOR ART

One prior method of measuring bed height involves the installation of pyrometers at, for example, furnace air port levels. Temperature measurements are then used to infer bed height. This simple technique equates relatively low and high temperatures with the presence or absence, respectively, of the smelt. A problem with this technique is that gas temperatures near the bed can vary greatly with variations in air distribution and cause false readings unrelated to bed height. Also, such a monitoring system tells little about the distribution of bed material at the central regions of the bed, important information since past observations suggest that material distribution is non-uniform.

Many chemical recovery boiler operations presently employ closed circuit TV cameras to produce images of the smelt bed. These cameras should provide all necessary information on bed configuration and height in a form that could be readily interpreted and used by the recovery boiler operator. However, the image produced is intermittent with individual regions of the bed visible only about 10–20% of the time. An impression of the bed configuration is gained only by observing images for a period of minutes over which various portions fade in and out of view. Most of the time the image is obscured by swirling clouds of dust or incandescent gas. Bright flashes light up small regions of the bed and occasionally silhouette intervening portions of the bed producing for a moment a clear impression of bed configuration. The entire bed is, however, never visible at once and the walls of the furnace are not discernible. Experience with these video imaging systems has been that because of the intermittent nature of the image, the information provided is generally insufficient to permit operational control decisions.

A number of imaging systems have been developed for viewing interiors of closed, hot vessels other than recovery boilers, to determine some internal characteristic or condition. Most of these systems are designed for use in blast furnaces, coke ovens and the like.

In a recovery boiler, typical smelt bed temperatures are at about 1000° C., with overlying combustion gases at temperatures of 1100°-1300° C. In blast furnaces, the stock or ore/coke surface temperatures are on the order 150°-300° C. and the overlying gases are at temperatures of 90°-130° C. Because of these relatively low temperatures, there is very little visible radiation from the stock charge, about 12 orders of magnitude less than the intensity of visible radiation from a recovery boiler smelt bed. A number of prior art systems suggest, as does the Ponghis U.S. Pat. No. 3,718,758, the use of an illuminating source in combination with a TV camera, both of which are mounted on a probe and inserted into the vessel. The lack of ambient visible light coupled with an interest in measuring stock surface temperatures led Ponghis to employ optical illumination in the infrared range.

Where temperatures of the surfaces to be imaged are sufficiently high an infrared scanner may be used if there is insufficient visible light available. The Shimotsuma U.S. Pat. No. 3,588,067, describes just such a system in which an industrial television camera employing an infrared vidicon produces an image corresponding to the height and shape of the materials in the vessel. The infrared signal also produces temperature distributions. No mention is made by Shimotsuma of the system's ability to distinguish between the charge and the overlying gases. In light of conditions observed in recovery boiler environments, the lack of mention in Shimotsuma of any necessity to reject interferences from obscuring gases or particles suggests that these conditions are not present in the blast furnace environment.

In the chemical recovery boiler environment, it is not sufficient to use an infrared vidicon equipped camera alone to observe the bed since the vidicon is also sensitive to visible radiation. In contrast to the system of interest in Shimotsuma, the size and loading of fume particles in the recovery boiler are such that visibility is substantially obscured in the visible range virtually all the time. Elemental sodium and possibly some sodium hydroxide are vaporized at the bed surface and react with carbon and oxygen. Sodium carbonate is formed which condenses into liquid droplets of approximately 0.1 to 0.5 micrometer diameter. These constitute the fume present in the lower furnace. As these droplets are swept upward with the rising gas stream, they encounter regions of high sulfur dioxide concentration and the carbonate is displaced by sulfate so that the composition of the fume in the upper part of the furnace is almost entirely sodium sulfate.

The chemical recovery boiler environment also differs from blast furnace environments with regard to absorption/emission of radiation by the gases present above the material beds. In the recovery boiler, the gases above the smelt bed are significantly hotter than the bed surface. Therefore, radiation emitted by the gases within the spectral absorption and emission bands associated with the major gaseous species present will be much more intense than that emitted from the bed. Also, at the temperatures present in the recovery boiler these gaseous absorption/emission bands will be greatly broadened.

In the blast furnace, by comparison, the gases above the stock line are somewhat cooler than the stock surfaces so that the total radiation from the gases will be small compared so that of the surfaces. The absorption/emission bands will be fairly narrow compared with the corresponding bands in the recovery boiler. The primary effect of the gases in the blast furnace situation would be to absorb only that portion of the radiation emitted from the surface which lies within the relatively narrow absorption bands.

Thus, in the blast furnace situation, where there apparently is no significant fume or dust interferences and limited absorption/emission interferences, a broad band system which is sensitive to a wide range of visible and infrared wavelengths would likely work well. However, in the chemical recovery furnace, there are suspended light scattering particles or fume and gaseous absorptions and emissions at high temperature, both of which combine to obscure the surface to be imaged. The broad band infrared system of the prior art does not work much more efficiently than the visible range systems presently in use.

SUMMARY OF THE INVENTION

What has been discovered is that an infrared vidicon camera arrangement for imaging produces images suitable for boiler operation control where the spectral sensitivity of the system to specific IR wavelengths is limited, first of all, to greater than about 1 micrometer by suitable filtering. Secondly, the spectral sensitivity of the system must also be limited to avoid absorptions and emissions of radiation from the major species of gases just above the smelt bed.

The imaging apparatus of this invention for observing infrared emitting surfaces where the surfaces are substantially obscured by fume and dust particles which strongly scatter visible light and by absorptions and emissions of major species of overlying gases includes the following elements. An industrial closed circuit video camera, including an infrared imaging detector or vidicon tube is located near but insulated thermally from the surfaces to be detected. A holding means, mounted on the camera, positions an objective lens for the camera in line of sight with the surfaces to be imaged. An optical filter means limits the spectral sensitivity of the system to wavelengths greater than about 1 micrometer. The optical filter means also selectively rejects wavelengths of strong gaseous absorptions and emissions. Finally, a TV monitor receives the image detected by the vidicon camera and produces a continuous image of the bed surfaces.

The imaging apparatus of the invention produces a substantially clear view of the smelt bed of inorganic chemicals recovered from combustion of kraft black liquor derived from the pulping of wood. The optical filter excluding all radiation except a narrow band, thus avoiding the interferences caused by fume particles and gases which overlie the smelt bed surfaces and obscure visibility of those surfaces, is a key element of the invention. One practical filter is centered at 1.68 micrometers and has a band width of 0.07 micrometers. All other narrow band filters which avoid overlying particulate and gaseous interferences are contemplated as within the invention, including those for other hot surface systems.

DESCRIPTION OF THE PREFERRED EMBODIMENT

Figure 1:
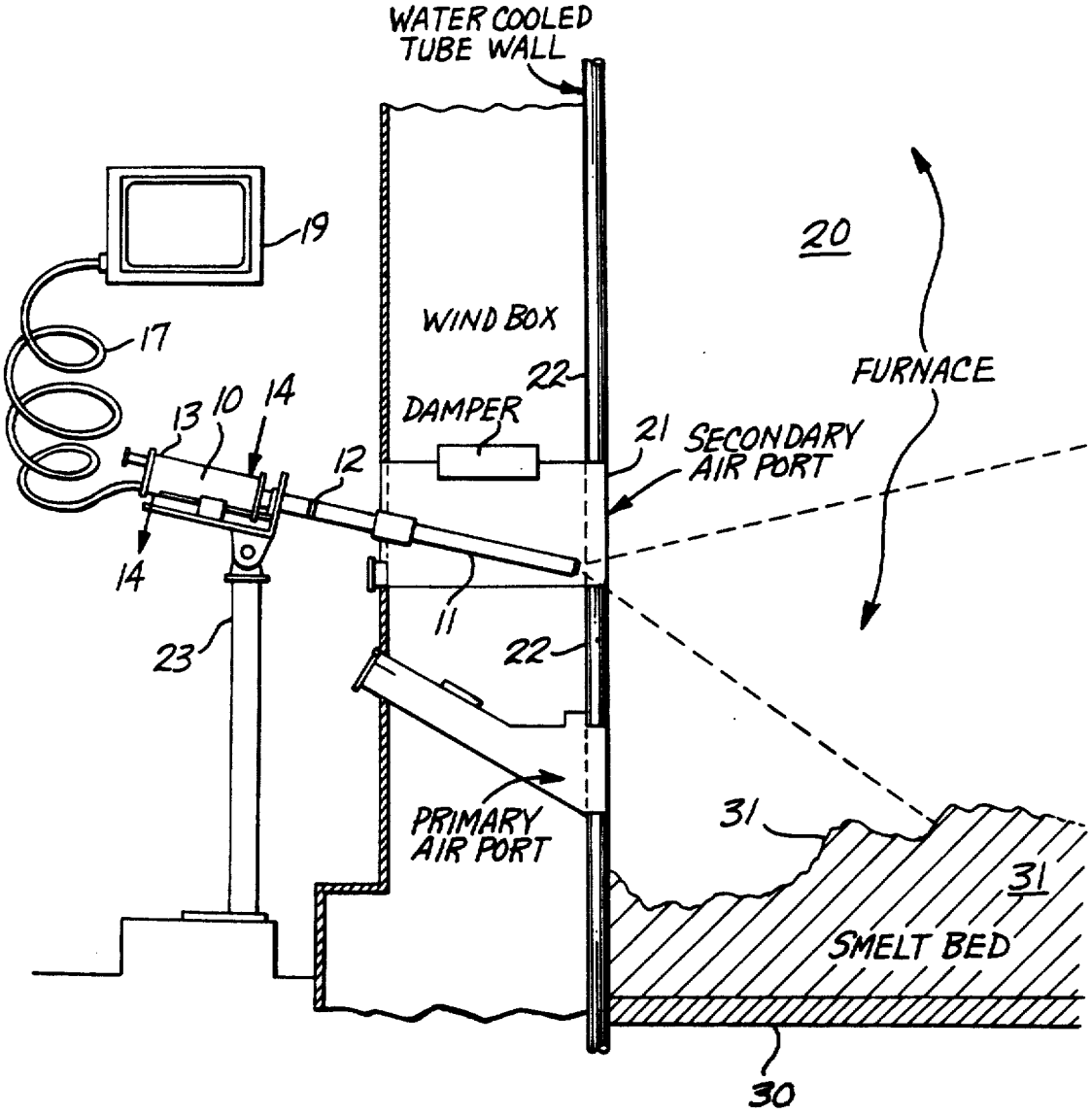
FIG. 1 is a schematic of the imaging apparatus of the invention shown in combination with a chemical recovery boiler smelt bed.

Referring to FIG. 1, the apparatus of the invention is depicted schematically. A closed circuit television camera 10, which includes an infrared vidicon tube component (not shown in detail), is located adjacent boiler 20 whose interior is to be imaged. A lens tube assembly 11, mounted upon camera 10, extends into the boiler 20 through an aperture 21 in the boiler wall 22. The lens tube contains such objective, collecting and collimating lenses (not shown in detail) as are conventionally necessary to transmit an image to be remotely reproduced from the object to be observed to the infrared vidicon 10. The camera 10 is mounted on a stand 23 which permits horizontal and vertical adjustment to view a substantial portion of the boiler floor 30 and any smelt bed 31 accumulated thereupon.

An optical filter 12 is a key element of this invention. It is selected to limit the wavelength of light transmitted to the vidicon from the object to be imaged to wavelengths greater than 1 micrometer. This limitation is imposed to avoid image interferences caused by particulate and fume overlying the surface to be imaged.

The optical filter 12 further limits the transmitted light from the surfaces to be imaged to a narrow band which avoids the light emissions of the principal species of hot gases overlying the surface to imaged. Careful selection of wavelengths transmitted to avoid these gaseous interferences is critical to obtaining the dramatically improved images of the surfaces to be reproduced.

Both camera and the lens holder are provided with an enclosure 13 designed to protect them from the dirty mill environment. A cooling and purging air system 14 insures that the temperature of the lens and camera do not exceed safe operating levels. The air cooling system also creates a high velocity air purge at the end of the lens to prevent combustion gases, char, or smelt from fouling the optics. It was discovered that by placing the end of the lens tube 11 approximately 5–10 cm back from the wall tubes 22, fouling of the lens tube was virtually eliminated without sacrificing the field of view.

A cable 17 transmits the image obtained through the lens and vidicon for reproduction upon a television monitor 19.

As noted above, a most critical element of this imaging apparatus and its ability to obtain unobscured images lies in the selection of an optical filter 12 which avoids interferences caused by fume particulate and hot gases overlying the surfaces to be imaged. The selection process requires an analysis of the transport of radiation through particle-laden gases, and identification of those properties of the gases and particles which affect this transport process. In its simplest form, the solution to the equation of radiative transport may be expressed as:

$$I(\lambda)=I_s(\lambda)e^{-\gamma l}+B_\lambda(T_g)(1-e^{-\gamma l})$$

where $I(\lambda)$ is the intensity of radiation at wavelength $\lambda$ reaching an observer at a distance l from the surface s; $I_s(\lambda)$ is the intensity of the radiation at wavelength $\lambda$ emanating from surface s in the direction of the observer; $B_\lambda(T_g)$ is the black body intensity at the gas temperature, $T_g$; and $\gamma$ is the extinction coefficient of the particle laden gases between surface's and the observer. This assumes that the extinction coefficient and the gas temperature are constant along the path l.

As can be seen from this expression, when $\gamma$ is large, the radiation emanating from the surface is substantially attenuated and only radiation emitted by the gases reaches the observer; when $\gamma$ is very small, the radiation from the surface reaches the observer with little attenuation and the gases provide little interference. It is these regions of low $\gamma$, if they exist, where clear images of a surface such as the smelt bed of interest here may be obtained.

The extinction coefficient may be expressed as the sum of contributions from the gases and particles;

$$\gamma=\gamma_g+\gamma_{pa}+\gamma_{ps}$$

where $\gamma_g$ is the absorption coefficient of the gases, $\gamma_{pa}$ is the absorption coefficient of the particles and $\gamma_{ps}$ is the scattering coefficient of the particles. In order to establish reasonable estimates of the magnitudes of these quantities, it is necessary to examine the conditions which exist in the environment of interest, here the lower furnace region.

Specific information which is required includes the magnitudes of gas temperature, gas species concentrations and optical properties, particle sizes and mass loading, as well as particle optical properties. Virtually no experimental data exists for any of these quantities in the lower part of the furnace. However, reasonable estimates of these quantities can be made which will permit selection of an appropriate filter.

Figure 2:
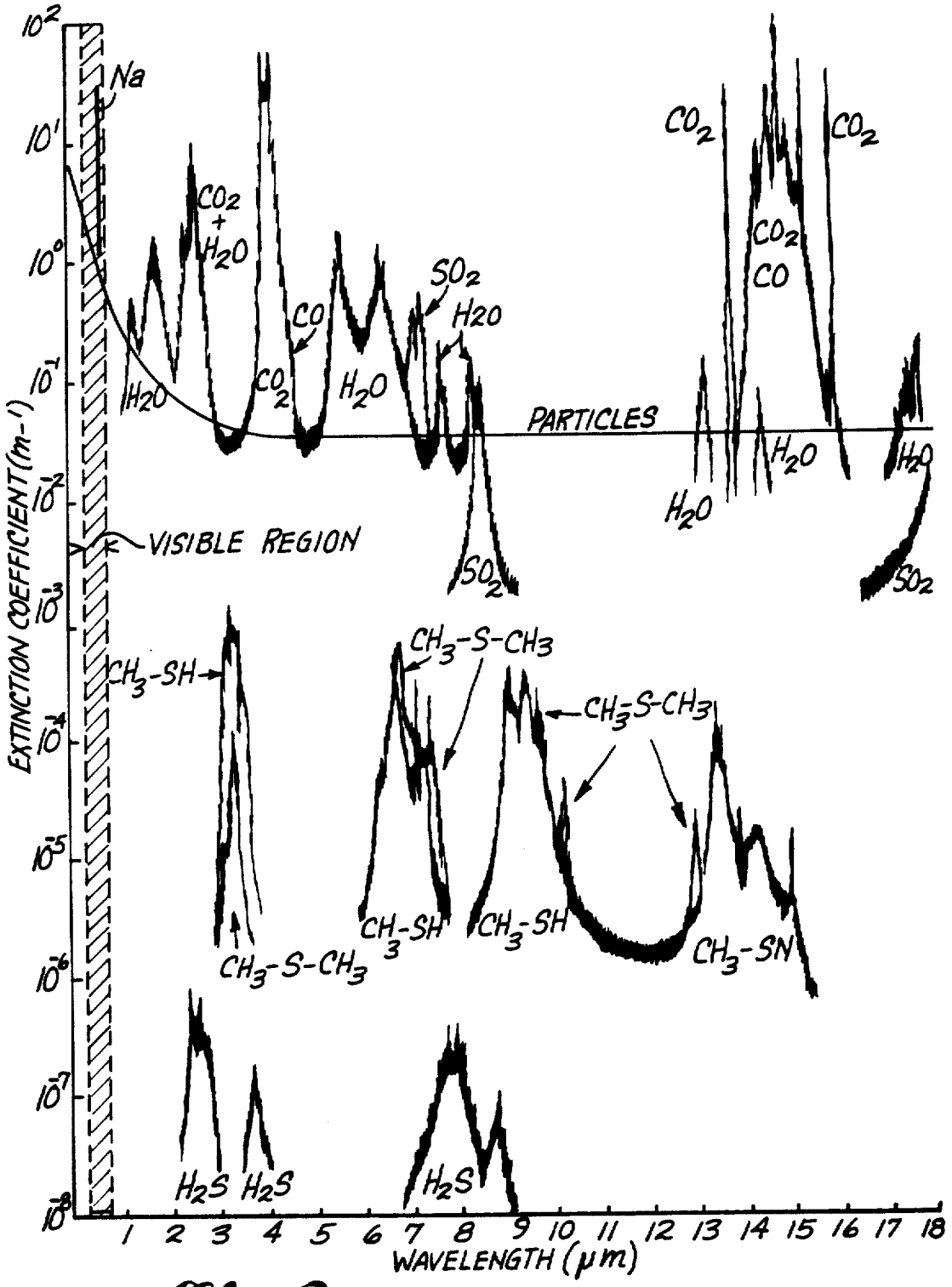
FIG. 2 predicts extinction coefficients ($m^{-1}$) as a function of wavelength (micrometers) for emissions of gases and light scattering particulates overlying a smelt bed.

In the absence of reliable measurement of gas species concentrations in the various zones in the recovery furnace, a computer model was designed using thermochemical equilibrium calculations and heat and mass balances to provide at least rough indications of the probable magnitudes of these quantities and of the gas temperatures in the various zones of the furnace. See Merriam, R. L., "Computer Model of a Kraft Recovery Furnace—Version 1.0," Vol. II, p. 3–7, Arthur D. Little, Inc. (August 1979). The computer model concentrations were combined with data on the spectral properties of the products of the combustion of alcohol, which are CO, $CO_2$, $H_2O$, $N_2$ and $O_2$, and with data on the low temperature absorption spectra of sulfur compounds expected to be generated, to provide rough estimates of the probable contribution these species make to the extinction coefficient as a function of wavelength. Estimates of extinction coefficients calculated using the computer model and related data, based upon typical concentrations in the lower furnace, are shown in FIG. 2 as a function of wavelength. FIG. 2 shows that the primary contributions or interferences from gaseous species are due to $CO_2$, $H_2O$, $SO_2$ and Na.

A somewhat different analysis is necessary to estimate extinction coefficients for the fume particulate interference. The reported measurements of particle emissions from recovery boilers performed both before and after particle removal equipment suggest the presence of three distinct classes of particles in the chemical recovery boiler environment. There are submicron fume particles (0.2–0.5 micrometer diameter) consisting primarily of sodium sulfate and some sodium carbonate. There are large spheres (10–100 micrometers diameter) of sodium sulfate and carbonate presumably arising from suspension burning of liquor droplets. The third class of particulates includes the very large (up to 2,000 micrometers diameter) char fragments having high carbon content.

Literature studies show mass mean particle size to be about 1 micrometer. These studies typically involve sampling after the boiler, and it is highly likely that most of large particles in the furnace would have been captured on the boiler tubes. Thus, the mean mass diameter of particles in the furnace will be much larger than 1 micrometer. One model indicates that approximately 35 percent by mass of the particle loading is fume from the bed and 65 percent is char and carryover from liquid suspension burning. This would suggest that the mass mean diameter of particles in the furnace would be heavily weighted toward that of the larger carryover particles. Recent measurements of superheater deposits show a deposition rate consistent with an aerodynamic mean diameter of 50 micrometers, which is supported by scanning electron microscope photographs of spherical particles collected in the upper furnace. Another model shows that about 9 percent of the sodium in the black liquor ends up in particulates which suggests for a typical kraft recovery boiler that the total mass loading of particulates will be about 2.3 g/m$^3$.

Analysis of the literature and models permits estimation of particle sizes, mass loadings and compositions as shown the following table.

KRAFT CHEMICAL RECOVERY BOILER
Estimated Particles Sizes, Mass Loadings and Compositions

| Particle Type | Mass Mean Diameter (μm) | Mass Loadings (g/m$^3$) | Volume Concentration (m$^3$/m$^3$) | Number Density (cm$^{-3}$) | Composition |
|---|---|---|---|---|---|
| Fume | 0.3 | 0.8 | $3.0 \times 10^{-7}$ | $2.0 \times 10^{7}$ | $Na_2SO_4$ + $Na_2CO_3$ |
| Carryover + Char | ≧75.0 | 1.5 | $5.5 \times 10^{-7}$ | 2.5 | $Na_2So_4$ + $Na_2CO_3$ + C |

To make estimates of the magnitudes of the particle absorption and scattering coefficients, it is necessary to consider both their size and composition. The absorption and scattering coefficients are related to "efficiency factors" for absorption and scattering described by Mie theory for the interaction of light with small particles. See H. C. Van De Hulst, "Light Scattering by Small Particles," John Wiley and Sons, New York (1957) and M. Kerker, "The Scattering of Light and Other Electromagnetic Radiation," Academic Press, New York (1969). The particle absorption and scattering coefficients may be expressed in terms of these efficiency factors as follows:

$$\gamma_{pa}=3/2Q_a(m, \lambda)C_v/D_{32}$$

$$\gamma_{ps}=3/2Q_s(m, \lambda)C_v/D_{32}$$

where $\overline{Q}_a$ is the mean absorption efficiency for a given collection of particles, $\overline{Q}_s$ is the mean scattering efficiency, m is the complex refractive index of the particles, λ is the wavelength of light, $C_v$ is the volume concentration (m$^3$ of particles per m$^3$ of gas) and $D_{32}$ is the Sauter mean diameter of the particle collection which is equal to the total particle volume divided by the total particle surface area.

The fume particles are composed primarily of sodium sulfate and sodium carbonate which are virtually transparent except in localized spectral regions in the infrared beyond 5 micrometers. Therefore, except in those regions, the imaginary part of their refractive index will be negligible making the absorption efficiency also negligible. In the region beyond 5 micrometers, their small size with respect to the wavelengths will result in extremely small absorption efficiencies even in a case where the imaginary part of the refractive index is significant. Thus, in the case of fume particles, $\gamma_{pa}$ will be negligibly small. However, the scattering efficiency exhibits a strong resonance at wavelengths comparable to the particle diameter. Therefore, scattering by these particles will be substantial throughout the visible and out to about 1.0 micrometer in the infrared. This is shown by the large peak in the extinction coefficient curve for particles at about 0.2 micrometer in FIG. 2.

The larger carryover and char particles are likely to contain significant amounts of fixed carbon, making them highly absorbing having large imaginary refractive indexes. This, coupled with their large size, at all wavelengths of interest, results in the scattering and absorption efficiencies for these particles being both very nearly equal to unity. Because they are so large, however, their number density is very low (2-3/cm$^3$). Thus, the absorption and scattering coefficients due to these particles are small ($\gamma_{pa}=\gamma_{ps}\leqq 0.015$ m$^{-1}$) for wavelengths less than about 30 micrometers. This effectively sets the lower limit on extinction for the gas particle system throughout the region of interest. Thus, it is apparent that apart from a sodium emission/absorption phenomenon, it is scattering by fume particles which limits visibility in the visible portion of the spectrum. In this region, the extinction coefficient due to fume particles is on the order of 1-5 per meter, which implies that the intensity of radiation originating at the bed is reduced by 98 percent in 1-4 meters. This explains why it is not possible to see the far wall of a 10-meter wide furnace utilizing visible light.

Beyond a wavelength of about 4 micrometers in the infrared, the extinction coefficient for particles is predominantly due to large carryover and char particles, and is nearly constant at 0.03 m$^{-1}$. Therefore, in the spectral windows between the gaseous absorption/emission peaks, radiation should be able to travel a distance 130 meters before suffering 98 percent attenuation. In these regions, visibility within the furnace should be excellent.

Spectral windows generally suitable for smelt bed imaging identified by the above analysis include the following: 1.57 to 1.73 micrometers; 2.23 to 2.43 micrometers; 3.25 to 4.05 micrometers; 4.80 to 5.30 micrometers; 6.90 to 7.20 micrometers; 7.60 to 7.80 micrometers; 7.90 to 13.90 micrometers. Other windows beyond 13.90 micrometers are evident from inspection of FIG. 2.

Clearly the best visibility predicted by these calculations occurs beyond about 4 micrometers within the windows in the gaseous absorption/emission spectrum. However, infrared imaging devices capable of operating at these long wavelengths are quite costly, have relatively low resolution and often utilize detector elements which require cryogenic cooling, making them inappropriate for permanent unattended operation in a mill environment. Furthermore, special infrared transmitting optics are required for wavelengths greater than about 2.5 micrometers.

Within the last few years infrared sensitive vidicon tubes compatible with standard closed circuit TV cameras have become commercially available. These tubes typically are sensitive to radiation out to about 2 micrometers wavelengths.

Inspection of FIG. 2 shows that the lowest predicted value of extinction coefficient in the region below 2 micrometers in the window at about 1.7 micrometers between two water vapor bands. At this wavelength the predicted extinction coefficient is approximately 0.2 m$^{-1}$. This is an order of magnitude smaller than in the visible region of the spectrum and based on this estimate, light originating at the bed should propagate across the 10 meter-wide furnace with about 86 percent attenuation. This implies that the far wall will be visible at this wavelength.

EXAMPLE

The modified system of this invention is similar to commercial, visible light systems currently used except for the substitution of the infrared vidicon tube for the standard visible light tube and the addition of a narrow band interference filter. A Motorola high temperature CCTV system, including an enclosed camera and furnace lens tube as described above, was mounted, as shown in FIG. 1, with the lens tube inserted through a secondary air port of a Babcock and Wilcox kraft chemical recovery boiler. A Hamamatsu Type N 214, lead sulfide, 2.54 cm (1 inch) diameter infrared imaging detector vidicon tube manufactured by Hamamatsu Company of Hamamatsu City, Japan was substituted for the standard Motorola vidicon tube. A narrow band interference filter centered at 1.684 micrometers and having a band width of 0.07 micrometers was used as the spectral filter.

In testing this assembly, it was discovered that focus improved substantially by moving the vidicon tube further away from the lens tube by inserting a spacer between the camera body and the lens tube. It is believed that this increased separation was necessitated by the increase in focal length of the lens elements at the longer wavelengths. Once the focus had been adjusted it was discovered that the visibility at the wavelength selected was much better than with the conventional system. The entire bed within the field of view could be seen clearly and continuously and the height and configuration of the bed could be easily perceived. Surface features of the bed could be distinguished even at the far wall of the furnace. The bed was very low at the time of these tests and the primary and secondary air ports on the far wall could be seen fairly clearly as dark rectangular regions on the generally bright wall surfaces.

It is noted that the resolution of the infrared vidicon system is such that the individual primary air ports, approximately 5 cm×25 cm, could be discerned. The image indicates that under normal operating conditions, the system allows the resolution of features having dimensions of a few centimeters or less at a distance of 10 meters.

The infrared vidicon also has an intrinsically slower time response than the visible vidicon tube. This may be partially responsible for the fact that even large suspended particles and liquor droplets did not appear in the image. However, the time response is sufficiently short that material falling from the walls was observed as well as large "boulders" rolling across the bed from time to time. Dust raised by the primary air jets and by falling material hitting the bed was observed.

Because the system is relatively insensitive to radiation from the gaseous species which appears primarily at filter-excluded wavelengths and because the system operates in infrared range, the radiation observed is thermal radiation emitted by solid surfaces. Therefore, the observed intensity is related to the temperature of those surfaces. However, the orientation of the surfaces as well as their emissivity will also contribute to observed intensity distribution. The fact that visual judgment of bed contours agrees very well with the direction of travel of objects rolling on the bed surface under the influence of gravity supports the view that surface orientation plays a significant role in determining observed intensity distribution. At the same time, the fact that material falling from the walls which has been cooled by contact with the water tubes appears dark when it first hits the surface, but gradually becomes bright and indistinguishable from surrounding bed medium supports the view that the temperature of the material is also of great significance in image intensity.

The ability to view the inside of the furnace clearly provides an unprecedented opportunity to observe internal furnace processes and increase understanding of boiler operating phenomena. This invention is not limited in usefulness to just the kraft pulping chemical recovery boiler system. It is useful in viewing any hot surfaces obscured by overlying hot gases, fumes and particulates where appropriate filters can be selected, according to the above-described strategy, to avoid imaging interferences.

I claim:

1. An imaging apparatus for observing infrared emitting surfaces *of a kraft waste liquor recovery boiler smelt bed* where the surfaces are *at temperatures of at least 1000° C. and the overlying gases and fumes are at substantially higher temperatures with the smelt bed surfaces being* substantially obscured by fume particles which strongly scatter visible light and by hot gas species which are themselves strong infrared emitters and which selectively absorb radiation from the infrared emitting surface which comprises:

a. image detection means sensitive in the infrared region for sensing an image of the emitting surfaces;

b. lens means for projecting and focusing the infrared image of the surfaces on the detection means;

c. optical filter means limiting the spectral sensitivity of the imaging apparatus to wavelengths longer than 1 micrometer and rejecting wavelengths strongly scattered by suspended fume particles and strongly radiated by or absorbed by said gaseous species overlying the surfaces to be imaged; and d. display means responsive to the detection means for producing a substantially interference free visual image of the surfaces being observed.

2. The imaging apparatus of claim 1 wherein the optical filter means limits spectral sensitivity of the apparatus to bands lying in the infrared regions between 1.57–1.73, 2.23–2.43, 3.25–4.05, 4.80–5.30, 6.90–7.20, 7.60–7.80, and 7.90–13.30 micrometers, said bands substantially avoiding interference caused by fume particles, water vapor, carbon dioxide, and carbon monoxide.

3. The imaging apparatus of claim 2 wherein the spectral sensitivity lies in a narrow band centered substantially at 1.68 micrometers.

4. The imaging apparatus of claim 1 wherein the detection means is a television camera.

5. The imaging apparatus of claim 4 wherein said detection means includes an infrared sensitive vidicon tube.

6. Apparatus for observing the smelt bed surface and adjacent furnace surfaces in a pulp liquor chemical recovery boiler, wherein the surfaces are substantially obscured by fume particles which strongly scatter visible light and by hot gas species which are themselves strong infrared emitters and which selectively absorb radiation from the infrared emitting surface which comprises:

a. image detection means sensitive in the infrared region for sensing an image of the emitting surfaces;

b. lens means for projecting and focusing the infrared image of the surfaces on the detection means;

c. optical filter means limiting the spectral sensitivity of the imaging apparatus to wavelengths longer than 1 micrometer and rejecting wavelengths strongly scattered by suspended fume particles and strongly radiated by or absorbed by said gaseous species overlying the surfaces to be imaged, wherein the optical filter means limits spectral sensitivity of the apparatus to bands lying in the infrared regions between 1.57–1.73, 2.23–2.43, 3.25–4.05, 4.80–5.30, 6.90–7.20, 7.60–7.80, and 7.90–13.30 micrometers, said bands substantially avoiding interference caused by fume particles, water vapor, carbon dioxide, carbon monoxide, and sulfur compounds; and d. display means responsive to the detection means for producing a substantially interference free visual image of the surfaces being observed.

7. The imaging apparatus of claim 6 wherein the spectral sensitivity lies in a narrow band centered substantially at 1.68 micrometers.

8. The imaging apparatus of claim 6 in which the optical filter means adapts the apparatus for use in an environment in which the fume particles and hot gases above the surfaces being observed are hotter than the surfaces.

9. The imaging apparatus of claim 6 wherein the detection means is a television camera.

10. The imaging apparatus of claim 9 wherein said detection means includes an infrared sensitive vidicon tube.

*11. An imaging apparatus for observing an infrared emitting surface in a kraft pulp liquor recovery boiler where the smelt bed surface is substantially obscured by fume particles which strongly scatter visible light and by hot gas species which overlie the smelt bed surface and are themselves strong infrared emitters and which selectively absorb radiation from the infrared emitting surface, which apparatus comprises smelt bed surface observation means including:*

*(a) infrared radiation sensing and detection means including optical filter means, said radiation sensing and detection means being responsive only to radiation in a limited band avoiding absorptions and emissions of radiation from the hot gas species overlying the smelt bed surface and greater than about 1 micrometer to avoid fume interference; and*

*(b) display means responsive to the limited band radiation detection means providing a substantially interference free visual image of the smelt bed surface.*

*12. The imaging apparatus of claim 11 wherein the image detection means includes an infrared sensitive vidicon tube the spectral sensitivity of which is in the region up to about 2 micrometers wavelength.*

*13. An apparatus according to claim 11, wherein the spectral sensitivity of the sensing and detection means lies in a narrow band centered substantially at 1.68 micrometers.*

*14. The imaging apparatus of claim 11, comprising filter means limiting the spectral sensitivity of the apparatus to the infrared region between 1.57 and 1.73 micrometers.*

*15. The imaging apparatus of claim 11 in combination with a kraft pulp recovery boiler.*

*16. In an apparatus for recovering inorganic chemicals from black liquor, said apparatus including a pulp liquor chemical recovery boiler for receiving said black liquor in regulated amounts, said black liquor entering said recovery boiler and forming a smelt bed with a smelt bed surface within said recovery boiler; ignition means within said recovery boiler for burning said black liquor and forming fume particles and hot gas species which together overlie said smelt bed surface at temperatures of about 1100°–1300° C.; and smelt bed surface observation means, said observation means comprising, in combination:*

*image detection means mounted on said recovery boiler for sensing an image of said smelt bed surface and adjacent interior surfaces of said boiler in a limited band of radiation out to about 2 micrometers wavelength and responsively providing a radiation image thereof;*

*lens means for projecting and focusing the infrared image of the surfaces on the image detection means;*

*optical filter means limiting the spectral sensitivity of the imaging apparatus to wavelengths longer than 1 micrometer to avoid fume interference and rejecting all but a limited band of radiation to avoid emissions and absorptions from hot gaseous species overlying the smelt bed surface; and*

*visual display means, responsive to the limited band radiation detection means providing a substantially interference free visual image of said smelt bed surface and adjacent interior surfaces of the boiler.*

*17. An apparatus according to claim 16, wherein the image detection means includes an infrared sensitive vidicon tube with a spectral sensitivity limited to the region up to about 2 micrometers wavelength.*

*18. An apparatus according to claim 17, wherein the spectral sensitivity of the apparatus lies in a narrow band centered substantially at 1.68 micrometers wavelength.*

*19. In an apparatus for recovering inorganic chemicals from black liquor, said apparatus including a pulp liquor chemical recovery boiler for receiving said black liquor in regulated amounts, said black liquor entering said recovery boiler and forming a smelt bed with a smelt bed surface within said recovery boiler; ignition means within said recovery boiler for burning said black liquor and forming fume particles and hot gas species which together overlie said smelt bed surface at temperatures of about 1100°–1300° C.; and smelt bed surface observation means viewing the smelt bed surface through a port of the boiler, the observation means comprising infrared radiation sensing and detection means including optical filter means, said radiation sensing and detection means being responsive only to radiation in a limited band avoiding absorptions and emissions of radiation from the hot gas species overlying the smelt bed surface and greater than about 1 micrometer to avoid fume interference; and*

*display means responsive to the limited band radiation detection means providing a substantially interference free visual image of the smelt bed surface.*

*20. An apparatus according to claim 19, an image sensing and detection means including an infrared sensitive vidicon tube with a spectral sensitivity limited to the region up to about 2 micrometers wavelength.*

*21. An apparatus according to claim 19, wherein the spectral sensitivity of the sensing and detection means lies in a narrow band centered substantially at 1.68 micrometers.*

*22. An apparatus according to claim 19, an optical filter means limiting the spectral sensitivity of the apparatus to a band lying in the infrared radiation region substantially between 1.57–1.73 micrometers wavelength.*

* * * * *